United States Patent [19]

Moor

[11] Patent Number: 5,706,992
[45] Date of Patent: Jan. 13, 1998

[54] BACKPACK FOR CARRYING A LAPTOP COMPUTER

[75] Inventor: Marc Moor, Hilliard, Ohio

[73] Assignee: The Mead Corporation, Dayton, Ohio

[21] Appl. No.: 748,379

[22] Filed: Nov. 13, 1996

[51] Int. Cl.$^6$ ................................................. A45F 3/04
[52] U.S. Cl. .................... 224/657; 224/153; 224/644; 224/654; 224/657; 190/102
[58] Field of Search ........................ 224/153, 250, 224/257, 578, 627, 644, 654–659, 930; 190/102, 111

[56] References Cited

U.S. PATENT DOCUMENTS

| 135,254 | 1/1873 | Wallis . | |
|---|---|---|---|
| 4,236,657 | 12/1980 | Brunton | 224/153 |
| 4,609,084 | 9/1986 | Thomas | 190/110 |
| 4,655,343 | 4/1987 | Lane et al. | 224/153 |
| 4,790,431 | 12/1988 | Reel et al. | 206/305 |
| 4,901,897 | 2/1990 | Briggs et al. | 224/153 |
| 4,984,662 | 1/1991 | Jacober | 190/107 |
| 5,010,988 | 4/1991 | Brown | 190/104 |
| 5,154,332 | 10/1992 | Williams et al. | 224/153 |
| 5,160,001 | 11/1992 | Marceau | 190/102 |
| 5,209,384 | 5/1993 | Anderson | 224/209 |
| 5,214,574 | 5/1993 | Chang | 361/393 |
| 5,217,119 | 6/1993 | Hollingsworth | 206/583 |
| 5,494,157 | 2/1996 | Golenz et al. | 206/370 |
| 5,524,754 | 6/1996 | Hollingsworth | 206/320 |
| 5,529,184 | 6/1996 | Sadow | 206/320 |
| 5,544,792 | 8/1996 | Arnwine | 224/153 |
| 5,547,052 | 8/1996 | Latshaw | 190/102 |
| 5,566,797 | 10/1996 | Van Himbeeck | 190/102 |

FOREIGN PATENT DOCUMENTS

| 2197582 | 5/1988 | United Kingdom . |
| 2236945 | 4/1991 | United Kingdom . |

Primary Examiner—Henry J. Recla
Assistant Examiner—Timothy L. Maust
Attorney, Agent, or Firm—Thompson Hine & Flory LLP

[57] ABSTRACT

A backpack for carrying a laptop computer comprising: flexible front, rear, bottom and side panels the interior surfaces of which define the interior of the backpack, wherein the side panel extends along each side and across the top of the backpack and the front, rear and side panels are joined together along their perimeters; a compartment for storing a laptop computer in the interior of the backpack; a first closure means extending longitudinally along the side panel and transversely across the top to control access to the compartment; at least one adjustable interlocking assembly joined to the backpack so as to bridge the first closure at the bottom half of the backpack whereby pivotal separation of the first closure along the side and the top panels is restricted to a predetermined interval when the closure means is opened; and a pair of adjustable shoulder straps connected to the exterior of the rear panel for carrying the backpack.

23 Claims, 4 Drawing Sheets

BACKPACK FOR CARRYING A LAPTOP COMPUTER

BACKGROUND OF THE INVENTION

The present invention relates to a backpack for use in storing and carrying a laptop computer.

Laptop computers have become quite common for business, school and personal uses in recent years. With the portability of the laptop computer, there is a need for a convenient and secure carrying case such as a backpack for carrying such laptop computers. Conventionally, laptop computer carrying cases have been in the form of carrying cases which resemble small suitcases. In those cases where backpacks have been adapted to carry laptop computers, the loading and unloading of the laptop computer with respect to the opening of backpack has proven to be highly inconvenient. For example, the backpack generally provides a small opening where the user must get the computer into the backpack through a small opening or the backpack is opened along three sides so that the backpack opens at a 180° angle, a more convenient and efficient configuration would be somewhere between the extremes.

Accordingly, there is a need for a backpack constructed so as to provide a more convenient and efficient loading and unloading of a laptop computer into a backpack.

SUMMARY OF THE INVENTION

In accordance with the present invention, there is provided a backpack for carrying laptop computers comprising a main compartment for receiving the laptop computer having flexible front, rear and bottom panels and a flexible side panel joined to said front, rear and bottom panels along the perimeters thereof to generally define the shape and size of the backpack and, more particularly the interior of the backpack. The front and rear panels are hinged along an axis of the bottom panel of the backpack intermediate the bottom longitudinal edges of the front and rear panels and is openable along the top and side panels intermediate to and parallel with the top and side edges of the front and rear panels by a closure means, preferably a zipper, which extends longitudinally along the side wall to control access to the interior of the compartment. In order to prevent the front and rear panels from opening completely so that they do not lie flat with their outer surface in a plane, i.e., 180° the backpack is provided with at least one adjustable interlocking assembly on each side of the backpack to restrict and maintain a predetermined interval of pivotal separation of the front and rear panels to allow convenient and easy access to the compartment interior. The backpack is provided with a pair of adjustable shoulder straps so that the backpack can be carried in a conventional manner on a user's back. The backpack is also provided with a pair of pliable handles at the top of the backpack so that it can be transported by using the handles rather than the shoulder straps if desired, in which case, the shoulder straps can be stored out of sight in a storage pocket on the rear of the backpack. The handles, as mentioned, are formed from a flexible material and can be releasably joined to each other in a conventional manner.

DETAILED DESCRIPTION OF THE INVENTION

Figure 2:
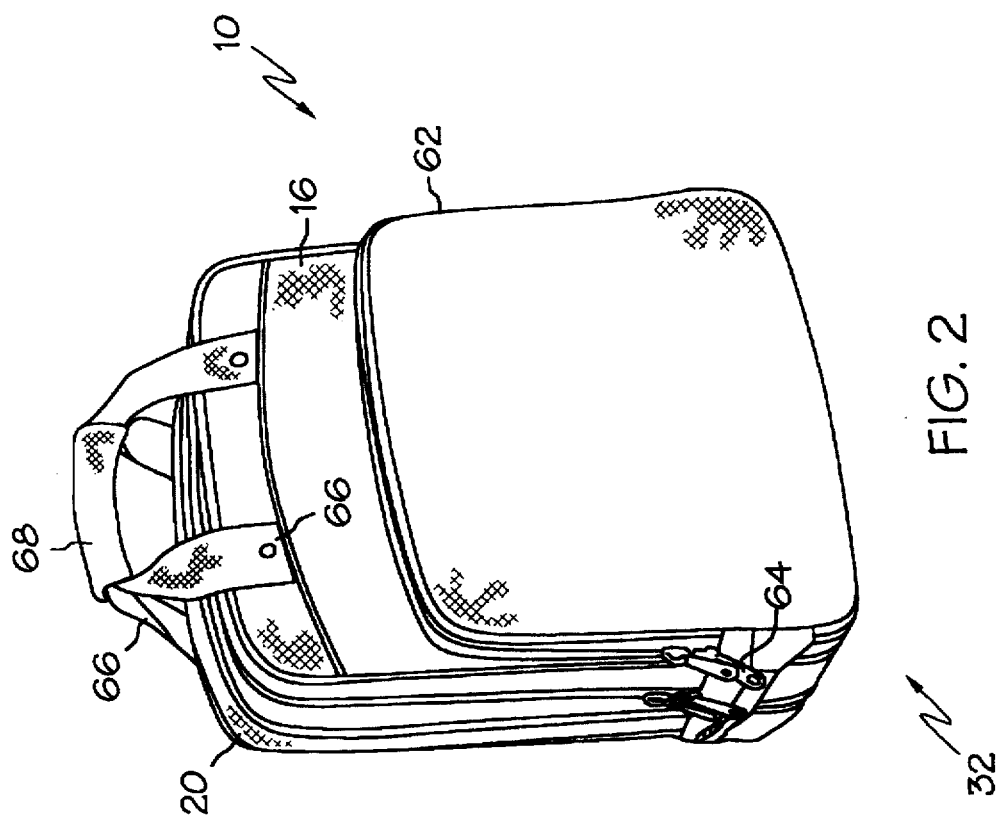
FIG. 2 is a perspective view showing the front of the backpack of the invention.
Figure 1:
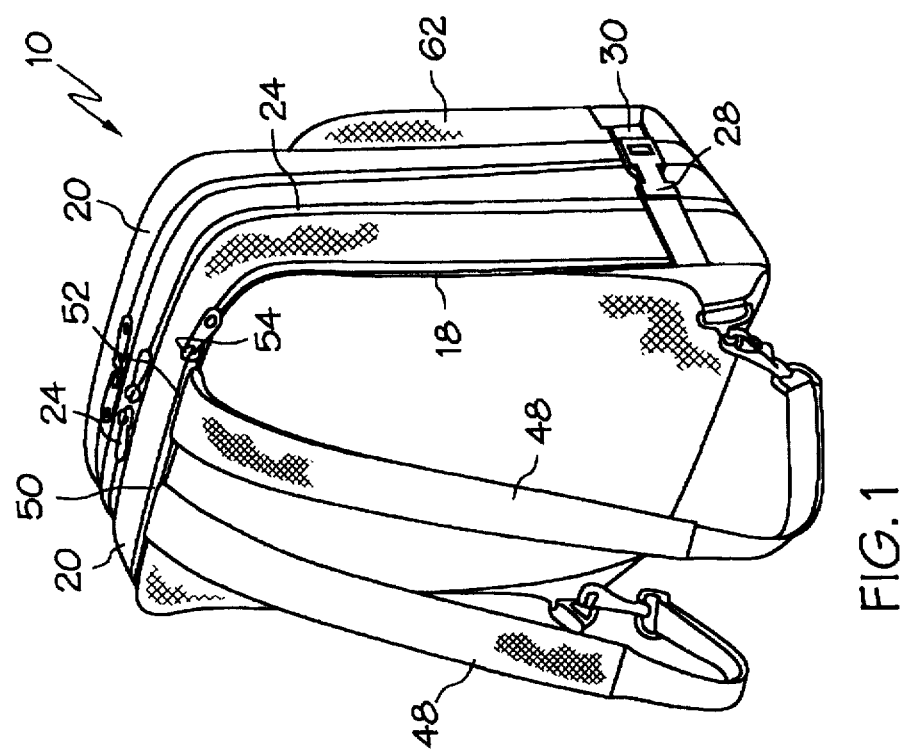
FIG. 1 is a perspective view showing the back of the backpack of the invention.
Figure 3:
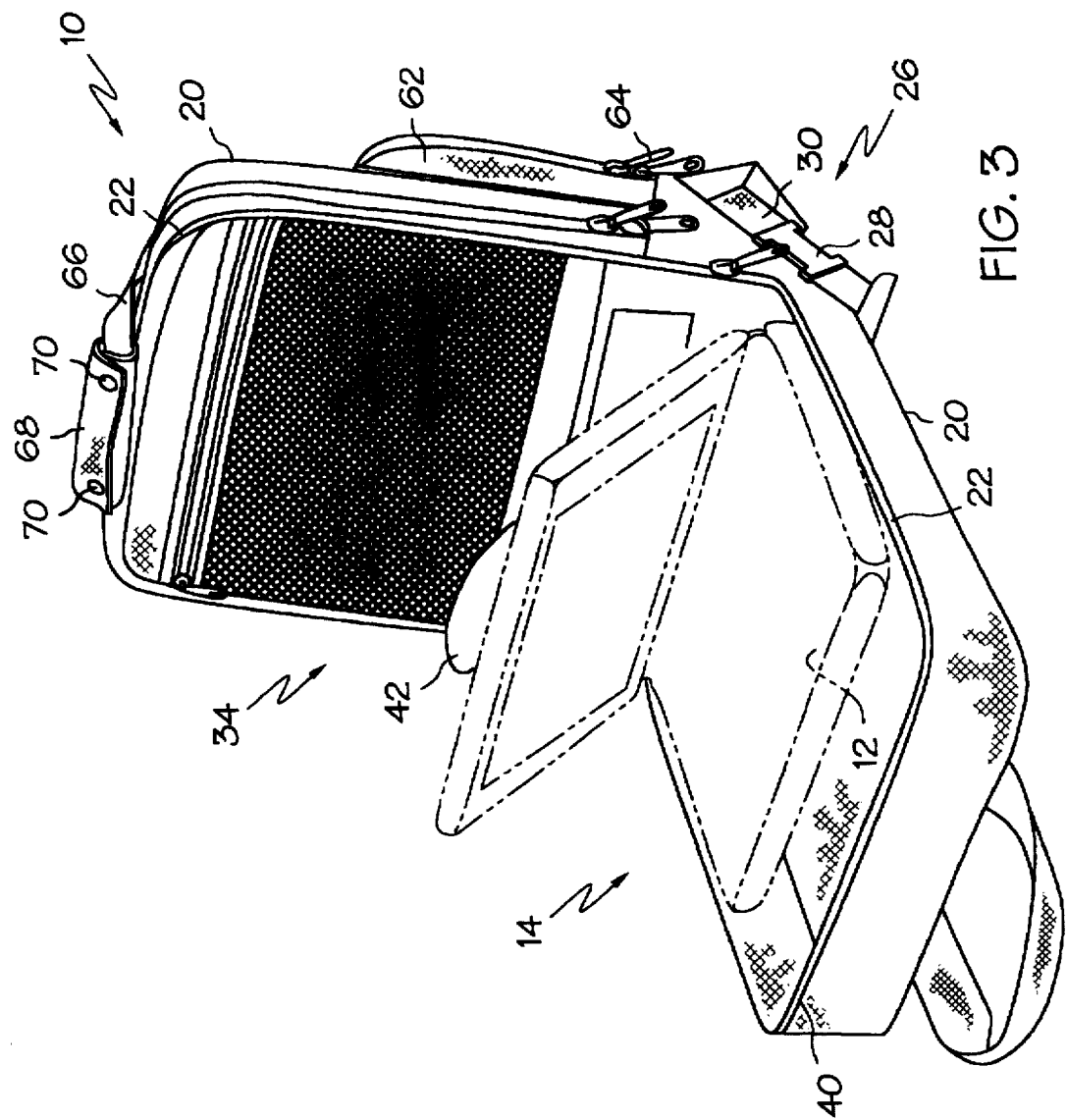
FIG. 3 is a perspective view showing the backpack of the invention in an open configuration.
Figure 4:
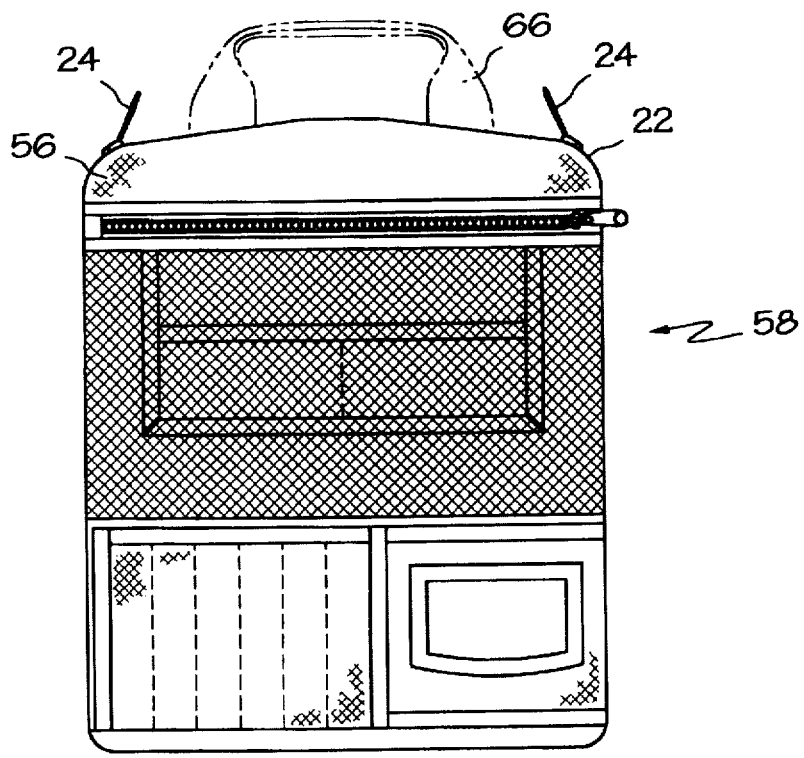
FIG. 4 is a plan view of the panel adjacent the computer housing compartment showing storage pockets and see-through web material.
Figure 5:
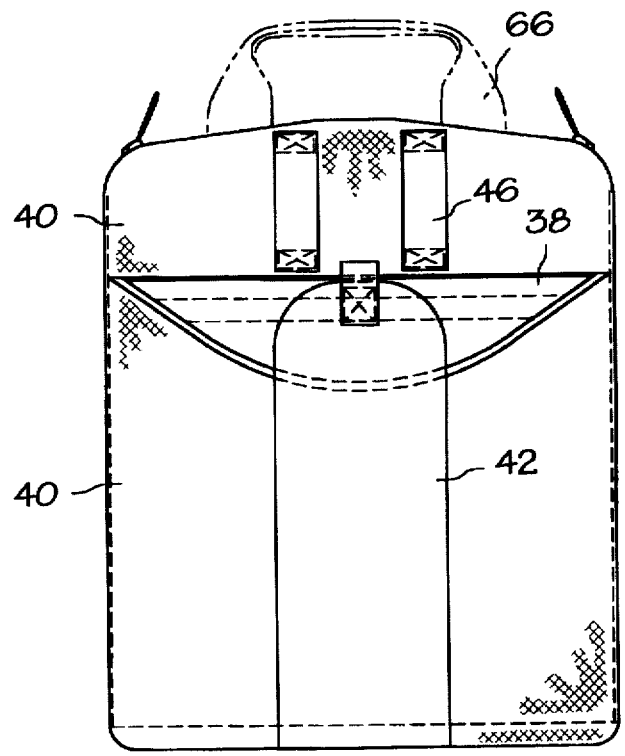
FIG. 5 is a plan view of the fastening means for securing the computer in the computer housing compartment.
Figure 6:
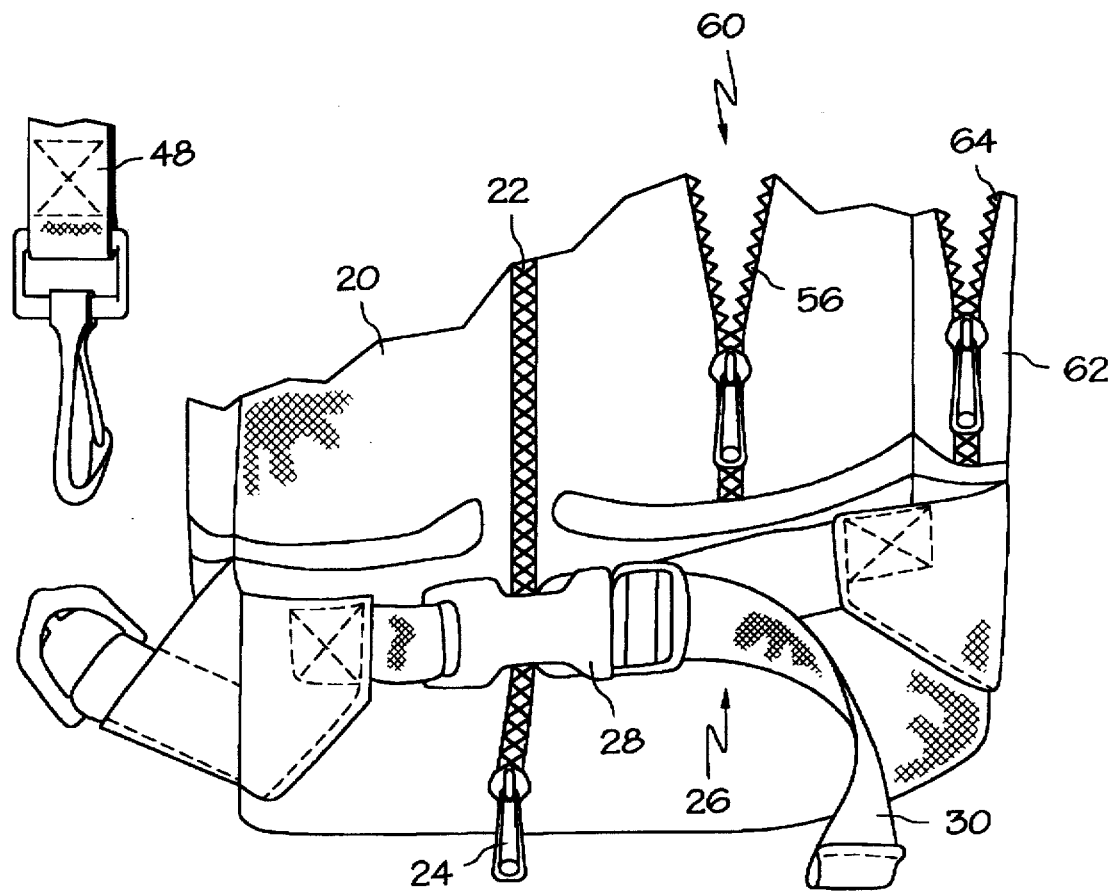
FIG. 6 is a plan view of the adjustable interlocking assembly of the invention.

A backpack 10 for carrying a laptop computer 12 in accordance with the is invention is shown in FIG. 1. The backpack 10 includes a main compartment 14 for carrying the laptop computer 12. The backpack 10 includes a flexible front panel 16 and a flexible rear panel 18, the surfaces of which are generally parallel to each other. The backpack 10 further comprises a sidewall 20 which extends around the perimeters of the front panel 16 and the rear panel 18 and is secured thereto to form the general size and shape of the backpack 10 and particularly to define the interior of the backpack 10. Access to the compartment 14 of the backpack 10 is provided by an opening in sidewall 20 which is secured by closure means 22 such as a zipper or the like. The closure means 22 extends along the top and both sides of sidewall 20 intermediate the top and side edges of the backpack, 10. Typically the closure means 22 is a zipper which includes one or more actuators 24 for opening and closing the compartment 14. The backpack 10 is typically made from a woven fabric material, preferably nylon or polyester.

In a highly preferred aspect of the invention, the front, rear, bottom and side panels have an outer and inner surface of the woven fabric material and an intermediate layer of foam or other light weight protective material between the outer and inner surfaces of the panels.

In accordance with the invention, the backpack 10 is provided with at least one adjustable interlocking assembly 26 on each side of the backpack 10 in the lower half thereof, preferably adjacent the bottom panel. The interlocking assembly 26 includes any easily releasable locking device 28 such as a buckle, spring clip and O- or D-ring fasteners, hook and loop fasteners, and the like. Alternatively, the interlocking device may simply be an adjustable strap. Preferably, the interlocking device is a buckle. The interlocking assembly 26 also includes a means for adjusting the interlocking assembly 26, preferably by at least one adjustable strap 30 wherein the strap is adjusted by any adjustable means, for example, by looping the strap through a multiple apertured lock. Other adjustable means may be employed such as a hook and loop device, snaps, or by tying such as with a cord. In accordance with the invention, the adjustable interlocking assembly 26 is useful for restricting the pivotal separation of the opening of the backpack 10 when the closure means 22 is open.

The compartment 14 includes a flexible restraint which comprises a first flexible fabric strap 38 preferably padded with a foam material which is joined to and extends laterally across the inner surface generally designated as 40, of the rear panel 18. Typically, the rear panel 18 and the side panel 20 adjacent the laptop computer contains a foam material between the inner and outer surfaces of the panels as a safety measure to prevent impact damage to the laptop computer 12 if accidently dropped or otherwise mishandled. The flexible restraint further comprises a second flexible strap 42 one edge of which is joined to the inner surface of the bottom panel 32 and extends across the laptop computer 12 vertically with respect to the first flexible strap. The first flexible strap 38 folds down across one end of the laptop computer 12. Typically, the bottom end, and the second flexible strap 42, extending across the laptop computer 12 from the bottom of the compartment 14, releasably interlocks with the first flexible strap 38, centrally with respect to the sides of the compartment to secure the laptop computer 12 in the compartment 14. In the upper region of the compartment 14 adjacent the inner surface of the rear panel 18, there is typically provided a pair of elastic straps 46 for storing various accessories.

The backpack 10 of the present invention contains a storage pocket 52 on the rear panel 18, and a pair of adjustable shoulder straps 48 connected to the rear panel 18 of the backpack 10. In a preferred aspect, the shoulder straps 48 are attached to the backpack by stitching along a seam 50 joining the back panel 18 and the top of side panel 20 and releasably attached a buckle or other such means on opposite sides of the backpack 10 along the seams joining the side panel 20 and the rear panel 18 in the lower half of the backpack 10. The shoulder straps 48 may be stored in the storage pocket 52 when not in use. The storage pocket 52 is provided with a closure means 54 such as a zipper to open and close the storage pocket 52.

In another preferred aspect of the invention, the backpack 10 further includes an internal panel which is joined to the front panel 16 by a closure means 56 to provide an pocket 60 for storing loose or bound sheet material. On the surface of the internal panel facing the computer compartment 14, there are provided a number of storage compartments for storing various computer, school and business accessories such as computer discs, business cards, pens, pencils, etc. In addition to those storage compartments mentioned, there is, preferably, a see-through storage compartment 58 made of a stretchable or non-stretchable, nylon or polyester web material for additional storage of bulkier accessories. The interior cavity of pocket 60 preferably includes interiorly gusseted sides (not shown) and at least one panel dividing the pocket into at least two segments. The panel is joined, preferably by stitching to the gusseted sides so that the loose and/or bound sheets can be separated and stored.

In yet another preferred aspect of the invention there is provided a storage pocket 62 on the front surface of the backpack 10 for storing additional items. The pocket 62 is openable and closable by a closure means 64 such as a zipper.

While the backpack 10 of the invention is typically carried on the back of the wearer using shoulder straps,, it is desired and within the concept of the present invention to use handles for carrying the backpack 10. Accordingly, in still another aspect of the invention, the backpack 10 is provided with handles 66 on each side of the backpack 10 which can be used, if desired, to carry the backpack 10. Typically, the handles 66 include a flexible strap 68 fixedly joined to one of the handles and releasably joined to the other handle by one or more snap locks 70 to maintain the handles together in an upright position for easy access.

When the backpack of the present invention is not in use or not being carried, it is typically placed in an upright position. Accordingly, it is preferred and within the scope of the invention to provide support feet upon which the backpack rests when not being carried or used. The support feet can be made from any suitable material, but they are typically made from a polymeric material such as molded polyvinyl chloride.

Having described the invention in detail, it will be appreciated that the present specification and claims are provided as means of illustration of the invention and not limitation, and that various modifications and changes may be made without departing from the spirit and scope of the present invention.

What is claimed is:

1. A backpack for carrying a laptop computer comprising:
    flexible front, rear, bottom and side panels the interior surfaces of which define the interior of said backpack, wherein said side panel extends along each side and across the top of the backpack and said front, rear and side panels are joined together along their perimeters;
    a compartment for storing a laptop computer in the interior of said backpack;
    a first closure means extending longitudinally along said side panel and transversely across said top to control access to said compartment;
    at least one adjustable interlocking assembly joined to said backpack so as to bridge said first closure at the bottom half of said backpack whereby pivotal separation of said first closure along said side and said top panels is restricted to a predetermined interval when said closure means is opened; and
    a pair of adjustable shoulder straps connected to the exterior of said rear panel for carrying said backpack.

2. The backpack of claim 1 wherein said at least one adjustable interlocking assembly comprises a buckle attached to adjustable cinch straps, said cinch straps being joined to said front and said rear panels of said backpack.

3. The backpack of claim 1 wherein said compartment further comprises a flexible restraint comprising a first flexible padded fabric strap, one edge of which is joined to and extends laterally across the inner surface of said rear panel in the upper half thereof to engage an end of said laptop computer, and a second flexible padded strap, one end of which is fixedly joined to the inner surface of the bottom panel and extends across said laptop computer vertically with respect to said first flexible strap and releasably interlocks with said first flexible strap to secure said laptop computer in said compartment.

4. The backpack of claim 1 wherein said closure means is a zipper.

5. The backpack of claim 1 wherein the exterior surface of said front panel further includes a storage pocket.

6. The backpack of claim 5 wherein said storage pocket includes closure means for opening and closing said pocket.

7. The method of claim 6 wherein said closure means is a zipper.

8. The backpack of claim 5 wherein said pair of shoulder straps is fixedly attached by stitching along the seam joining said rear panel and said top panel in the interior of said storage pocket, and releasable attached by a D-ring and snap lock on opposite sides of said backpack along the seams joining said side panels and said rear panel in the lower half thereof, wherein said backstrap is concealed in said storage pocket when not in use.

9. The backpack of claim 1 wherein said backpack further includes a pocket defined by the inner surface of said front panel and an internal panel, said internal pocket openable by a second closure means extending parallel to said first closure means along the side and top panels.

10. The backpack of claim 9 wherein said internal pocket includes interior gusseted sides and at least one panel dividing said pocket into at least two segments, said at least one panel being fixedly joined to said gusseted sides.

11. The backpack of claim 10 wherein said internal pocket includes additional storage areas on the surface of said internal panel opposite said compartment.

12. The backpack of claim 1 wherein the exterior surface of said front panel further includes a storage pocket.

13. The backpack of claim 12 wherein said storage pocket includes closure means.

14. The backpack of claim 13 wherein said closure means is a zipper.

15. The backpack of claim 11 wherein said internal pocket further comprises a see-through web storage compartment, said see-through web storage compartment being fixedly attached by sewing along its sides and bottom edges to said pocket and provided with a closure means along its top edge.

16. The backpack of claim 15 wherein said closure means is a zipper.

17. The backpack of claim 1 wherein said compartment further includes a pair of flexible handles joined to the front and rear panels at the top of said backpack for carrying said backpack.

18. The backpack of claim 17 wherein said pair of flexible handles further includes a flexible strap fixedly joined to a first handle and releasably joined to a second handle.

19. The backpack of claim 18 wherein said flexible strap is releasably joined to said second handle by one or more snap locks along the longitudinal edges of said strap.

20. The backpack of claim 1 wherein said backpack further comprises a plurality of polymeric support feet upon which said backpack rests when not being carried.

21. The backpack of claim 1 wherein said adjustable interlocking assembly is adjacent the bottom panel and is joined to said front and rear panels.

22. The backpack of claim 1 wherein said front, rear, bottom and side panels of said backpack is made from a woven fabric and said panels are padded with a foam material.

23. The backpack of claim 22 wherein said woven fabric is nylon or a polyester.

\* \* \* \* \*